United States Patent Office 3,192,263
Patented June 29, 1965

3,192,263
PRODUCTION OF DINITROPHENYL AND DIAMINOPHENYL ETHERS
Louis Spiegler, Woodbury, N.J., assignor to E. I. du Pont de Nemours and Company, Wilmington, Del., a corporation of Delaware
No Drawing. Filed Aug. 18, 1960, Ser. No. 50,339
9 Claims. (Cl. 260—571)

This invention relates to processes for producing dinitrodiphenyl ethers and diaminodiphenyl ethers.

It is an object of this invention to provide economically practical processes for producing dinitrodiphenyl ethers and diaminodiphenyl ethers in high yield and in a high state of purity. A further object is to provide a process for producing said compounds whereby the reduction of the dinitro compounds to the diamino stage may be integrated with the process of producing said dinitro compounds from its initial materials, in the sense that the reduction of the dinitro compound may be carried out in the same liquid medium in which it is produced, without isolating the dinitro compound or removing by-product salts. A still further object is to provide a method for purifying said diaminodiphenyl ethers which can be readily worked into the steps of recovering said diamino compounds from the medium in which they are produced. Other objects and achievements of this invention will become apparent as the description proceeds.

In the statements above and in the description which follows, the expressions dinitrodiphenyl ethers and diaminodiphenyl ethers are meant to include the simple compounds as well as compounds bearing further nuclear substituents other than hydroxy, acidic and basic radicals.

Diaminodiphenyl ethers, particularly, p,p'-dimainodiphenyl ether which is known in the trade as p,p'-oxydianiline, are valuable as bifunctional cross-linking and network-extending agents for various polymers which serve as resins, plastics and elastomers, or as intermediates for diisocyanates. Heretofore, p,p'-oxydianiline has been manufactured by laborious and costly processes, for instance by brominating diphenyl ether to the dibromo stage and then reacting upon this compound with ammonia in the presence of a copper catalyst. This process is not only costly, because of the relatively high cost of bromine, but is also likely to produce various isomers in the bromination step, which either make the principal product impure or require costly separation procedures.

In the case of triamino diphenyl ether, the requisite intermediate trinitrodiphenyl ether can be readily prepared by condensing 2,4-dinitrochlorobenzene with an alkali-metal nitrophenate in a convenient solvent such as aqueous dioxane. Attempts, however, to condense mononitrochlorobenzenes (e.g., p-chloro-nitrobenzene) with an alkali-metal nitrophenate by a similar procedure have hitherto led to disappointing results. Condensation, if any, takes place to a very low yield, and separation of the product from by-products and impurities constitutes a very difficult task. A 6% yield was reported by Cullinane et al. in J. Chem. Soc., 1934, 719, but only when they used pyridine in a fusion at 220° C. Litvinenko et al. (Chem. Abstract 51, 14651) obtained a 45% yield but only when using a five-fold quantity of p-chloronitrobenzene and heating for 25 hours at 245°–250° C. in the presence of a special copper catalyst which had been activated with iodine. Other workers in the field, ranging as far back as Austen in 1875 (Berichte 8, 666) have met with similar lack of success. The conclusion was reached by Raiford and Colbert in 1926 (J.A.C.S. 48, 2652-62) that in a reaction of this nature, "when the phenol contains a nitro radical, the reaction will fail unless the halogenated benzene contains more than one nitro group."

I have now made the surprising discovery that the reaction of a mononitrochlorobenzene with an alkali metal nitro phenate can be made to proceed smoothly, with the highest yields and with high-quality product, if the reaction is carried out in a solvent of the special group defined below. Furthermore, I have found that the reduction of the dinitrodiphenyl ethers thus obtained can be effected easily and with highest efficiency by catalytic hydrogenation in the same type of solvent. Moreover, the step of hydrogenation lends itself to successful performance in the very reaction mass in which the dinitro compound has been produced, without even removing the alkali-metal chloride formed in the condensation step. Finally, I have found that the recovery of the diamino compound obtained in the hydrogenation step can be combined with a recrystallization step from an alcohol in the presence of hydrazine, whereby to obtain the diamino product in an exceptionally pure crystalline state.

The aforementioned group of solvents on which the success of my invention depends can be characterized broadly as medium- to high-boiling, water-soluble amides of an aliphatic nature; but more particularly, the solvent is an organic liquid of the group consisting of water-miscible aliphatic amides of the formula

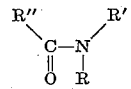

and water-miscible, saturated, heterocyclic compounds of the formula

wherein R, R' and R" are alkyl radicals of 1 to 4 C-atoms, while R''' is a saturated alkylene radical of which not less than 2 and not more than 5 C-atoms in a straight chain constitute part of the heterocyclic ring.

Typical specific illustrations of the above group of compounds are

N,N-dimethylacetamide,
N,N-diethylacetamide,
N,N-di-n-propylacetamide,
N,N-diisopropylacetamide,
N,N-di-n-butylacetamide,
N,N-dimethylpropionamide,
N,N-diethylproprionamide,
N,N-diisopropylpropionamide,
N,N-dimethylbutyramide,
N,N-diethylbutyramide,
N,N-dimethyltrimethylacetamide:
    $(CH_3)_3C \cdot CO \cdot N(CH_3)_2$,
N,N-diethyltrimethylacetamide,
N,N-dimethylisovaleramide:
    $(CH_3)_2CH—CH_2 \cdot CO \cdot N(CH_3)_2$,
N,β-dimethylpropiolactam:

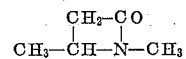

N-ethyl-β-methylpropiolactam,
N-methyl-2-pyrrolidone,
N-ethyl-2-pyrrolidone,
N-isopropyl-2-pyrrolidone,
1,5-dimethyl-2-pyrrolidone:

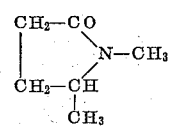

1,3,3,5-tetramethyl-2-pyrrolidone:

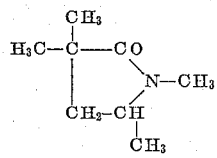

N-methyl-2-piperidone:

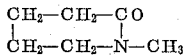

N-ethyl-2-piperidone,
and N-methyl-ε-caprolactam:

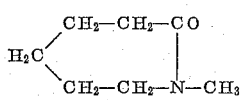

It is remarkable that while dimethylacetamide is the simplest member of the above group and gives very good results in this invention, the next lower homolog, dimethylformamide, is according to our experience not suitable at all.

The specific compounds hereinabove named are all water-miscible liquids of a saturated, aliphatic or cycloaliphatic nature, and have medium-high to high boiling points, which range from about 165° C. for dimethylacetamide to 235° C. for N-methyl-ε-caprolactam.

According to the preferred mode of my invention, the condensation of the chloronitrobenzene with the alkali-metal nitrophenate is carried out at about the highest temperature that is practical with the solvent selected. Under atmospheric conditions this will correspond to the reflux temperature of the mass. I have found that the period required for complete reaction is an inverse function of the temperature. Therefore, with dimethyl acetamide as solvent, the condensation reaction may be complete in 5 to 6 hours, whereas with N-methyl-ε-caprolactam it becomes complete in 3 to 4 minutes.

Contrary to the efforts reported in the literature by some investigators heretofore, the condensation reaction in my invention requires no copper catalysts and no excess of either component; accordingly, it is preferably carried out with essentially equimolecular proportions and without any catalysts whatever.

The condensation reaction may be exemplified by the following equation:

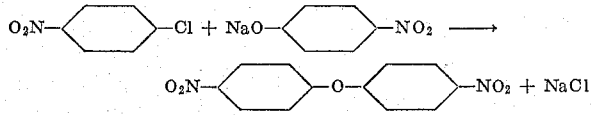

But instead of the above two simple initial reactants, any substitution derivatives of either reactant may be employed provided it is free of ionic or salt forming radicals such as OH, COOH, $SO_3H$ or $NH_2$ (not counting, of course, the first NaO group shown in the above formula of the nitrophenate). Stated in different words, the initial halogenonitrobenzene may be a compound of the formula

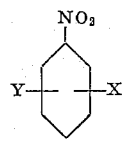

wherein X stands for a halogen such as Cl or Br and is located in a position ortho or para to the $NO_2$ group and Y is hydrogen, lower alkyl or O-alkyl or it may be a second halogen atom provided the latter is located meta to the $NO_2$ group. The nitrophenate, on the other hand, may be a compound of the formula

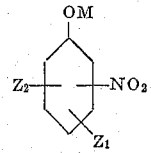

wherein M is an alkali-metal such as sodium or potassium, while $Z_1$ and $Z_2$ represent members of the group consisting of hydrogen, lower alkyl, lower alkoxy and halogen which is oriented meta with respect to the $NO_2$ group.

The above limitations on the positions of any halogen in the molecule other than X is based on my observation that only ortho- and para-oriented halogen reacts with the OM group to form an ether; therefore, to avoid formation of isomers and byproducts, any halogen in either molecule, other than X in the first formula, should best be located in meta position to the $NO_2$, whereby it is essentially non-reactive under the reaction conditions of this invention.

As specific illustrations of practical initial reactants that may be chosen for the improved process of my invention may be mentioned:

A. (HALOGENONITROBENZENES)

o-Chloronitrobenzene, p-chloronitrobenzene, 2,5-2,3- and 3,4-dichloronitrobenzene, 4-chloro-3-nitrotoluene, and o- or p-chloronitrobenzenes containing a methyl group in any other position, 2-chloro-5-ethylnitrobenzene, 4-chloro-2,5-dimethylnitrobenzene, 5-chloro-2-nitroanisol and 4-chloro-3-nitrophenetol. The corresponding bromonitrobenzenes are also operative but are naturally more expensive.

B. (ALKALI-METAL-NITROPHENATES)

The sodium or potassium salt of any of the following phenols: o-, m- or p-nitrophenol, 4-methyl-3-nitrophenol, 2-methyl-5-nitrophenol, 4-chloro-2-nitrophenol, 2,6-dichloro-4-nitrophenol, the corresponding bromo or dibromo-nitrophenols, 4-ethyl-3-nitrophenol, 2-ethyl-5-nitrophenol, 2-nitro-6-methoxyphenol, 2-nitro-3-hydroxy-5-methoxytoluene, 2,5-dimethyl-4-nitrophenol, 4,5-dimethyl-2-nitrophenol, 4-ethyl-2-nitrophenol, a mixture of 2-ethyl-4-nitrophenol and 2-ethyl-6-nitrophenol, and in general any nitrophenol containing one or more lower alkyl or alkoxy radicals (1 to 4 C-atoms) in any position or containing Cl or Br in position meta to the $NO_2$ group.

The alkali-metal in the above compounds may be sodium or potassium. Lithium is also suitable, but more expensive.

Many of the aforementioned alkali-metal phenolates are prepared by hydrolyzing with strong alkali the corresponding chlorine derivatives. Some of them, however, are explosive hazards in dry state. It is therefore a further advantage of this invention that instead of employing a dry nitrophenate, one may start with an aqueous press cake of the same. In such event, the reaction mixture containing the solvent, nitrophenate and halogenonitrobenzene is first dehydrated by distilling off the water, and is then heated to the desired higher temperature, to complete the condensation.

Moreover, instead of starting with a nitrophenolate, the nitrophenol may be used in the form of the free hydroxy compound. In this case, stoichiometric amounts of sodium or potassium hydroxide or an excess of an alkali metal carbonate is added to the reaction mass prior to the dehydration distillation, to form the alkali-metal phenolate in situ. Other conventional acid binders, including sodium or potassium bicarbonates or disodium phosphate, may be employed in place of the alkali carbonate.

The amount of solvent to be employed is not critical; it should be sufficient to produce a stirrable suspension at the condensation temperature, bearing in mind the formation of solid alkali-metal halide in the course of the reaction. As a rule, a quantity of the solvent equal in weight to the sum of the initial reactants, will suffice. Quantities twice or three times this amount may be employed, but higher quantities are simply wasteful. A convenient rule is to use a quantity of solvent equal in weight to form 1.5 to 2.5 times the weight of the halogenonitrobenzene started with.

If the dinitro compound is the desired end-product, an excess of either reactant may be employed, since the excess of the chloronitrobenzene can be removed by a steam distillation, and since the nitrophenolate remains soluble in the aqueous filtrate. Isolation of the dinitrodiphenyl ether may be achieved in any convenient manner, for instance by diluting the reaction mass with sufficient water to dissolve the by-product alkali-metal salt, and filtering off the precipitated dinitro-ether.

Isolation, however, is not necessary if the dinitro-ether formed is to be converted into the corresponding diamino compound. Instead, the further procedure according to this invention is to transfer the condensation mass to a vessel suitable for catalytic hydrogenation, for instance an autoclave capable of withstanding pressures up to 50 atmospheres, add a suitable hydrogenation catalyst (e.g., platinum or palladium supported on a suitable substrate such as carbon, alumina or kieselguhr), and either bubble hydrogen through the mass at atmospheric pressure or else pump it into the closed vessel to any desirable pressure, up to 50 atmospheres. The temperature of hydrogenation need not be very high. Temperatures in the range of 60° to 90° C. are suitable, although, if desired, temperatures up to 150° C. may be employed.

It will be noted that the details of hydrogenation do not differ very much from customary practice in the art except for the choice of solvent and for the fact that the by-products of the condensation step (e.g., NaCl) are present in the hydrogenation mass. Nevertheless, the latter may be filtered off from the hot reaction mass prior to hydrogenation. Furthermore, the hydrogenation process above sketched, using the special saturated amide type solvents of the formulas above indicated may, in fact, be applied to isolated dry dinitrophenyl ethers prepared by other processes.

The recovery of the diamine-ether from the hydrogenation mass may, likewise, follow customary procedure. For instance, the reduction mass may be drowned in water to precipitate the diamine plus catalyst and carrier. The filter cake may then be treated with aqueous hydrochloric acid to dissolve the diamine followed by filtration to remove the catalyst and carrier. Alkalization of the filtrate will again precipitate the diamine, which may now be filtered off and dried. Finally, the dried product may be recrystallized from an alcohol of 1 to 6 C-atoms, for instance, n-butanol, or from a mixture of a lower alcohol with another water-soluble solvent such as dimethyl acetamide or dimethyl formamide.

However, to minimize deterioration of the product by moisture and atmospheric oxygen, any of the aforementioned recovery steps, and particularly the last step (recrystallization from an alcohol) are best carried out in the presence of a small quantity of a reducing agent such as alkaline sodium hydrosulfite or sulfur dioxide. However, according to a further special feature of this invention, a volatile, basic, water- and alcohol-soluble reducing agent, such as hydrazine (occurring commercially as hydrazine hydrate) is preferred. Sequestering agents and absorbent clays or charcoal may also be employed in the acidification or reprecipitation step, to assist in removing traces of iron or other metallic impurities. Working under an inert atmosphere, such as nitrogen, during any of the above steps, especially the recrystallization step, is also of benefit.

Without limiting this invention, the following examples are given to illustrate my preferred mode of operation. Parts mentioned are by weight.

Part A—Condensation

EXAMPLE 1

A mixture consisting of 264 parts of N,N-dimethylacetamide, 79 parts of p-chloronitrobenzene, and 115 parts of an aqueous filter cake containing 80.5 parts of the sodium salt of technical p-nitrophenol, is heated under agitation in a reaction vessel equipped with a column for fractional distillation, condenser and receiver, while allowing the water to distil from the mixture. The reaction mass is then refluxed at about 180°–176° C. (pot temperature) for 5 to 6 hours. During this period, sodium chloride separates out. The course of the reaction may be followed by taking periodically test portions from the reaction solution, and determining the percentage of unreacted p-chloronitrobenzene present in the reaction mass.

At the end of 6 hours, such residual p-chloronitrobenzene is less than 0.3% of its initial value. The reaction mass is then drowned in 1000 parts of water, and the precipitated, 4,4'-dinitrodiphenyl ether is filtered off. The cake is washed with water to remove the sodium chloride and any unreacted p-nitrophenolate, and then dried at 80° C., giving from 118 to 120 parts of crude, 4,4'-dinitrodiphenyl ether melting at 142°–144° C. Nitrogen analysis by Dumas method and titration by $TiCl_3$ show this product to be about 99.5 to 100% pure.

If desired, the drowning step may be omitted. Instead, the hot reaction mass is filtered to remove sodium chloride, and cooled to crystallize out 4,4'-dinitrodiphenyl ether.

In the above procedure, essentially stoichiometric proportions of the initial reactants have been indicated. An excess of one of them, however, for instance up to 10% excess of the sodium p-nitrophenate, may be used without substantially affecting the results, inasmuch as the unreacted excess becomes separated in the drowning and filtration step. If, however, the condensation mass is to be subjected directly to hydrogenation, as in Example 14 below, close adherence to initial stoichiometric proportions is recommended.

EXAMPLE 2

A mixture consisting of 790 parts of N,N-dimethylacetamide and 340 parts of an aqueous filter cake containing 266 parts of the sodium salt of technical p-nitrophenol is treated as in Example 1 to distil off its water content. 240 parts of p-chloronitrobenzene are then added, and the mixture is refluxed at 175° C. for 6 hours, followed by drowning the reaction mass in 3000 parts of water, and isolating the 4,4'-dinitrodiphenyl ether as described in Example 1. A high yield of a bright, yellow colored product, melting at 142°–144.5° C., is obtained.

The aqueous filtrate from the drowning step may be subjected to fractional distillation to recover N,N-dimethylacetamide for re-use.

EXAMPLE 3

To a stirred solution of 78 parts of 3-nitro-4-hydroxytoluene in 520 parts of N,N-dimethylacetamide, there is slowly added a solution of 20.3 parts of sodium hydroxide in 30 parts of water, to form the sodium nitrocresolate. The water is then removed by fractional distillation as described in Example 2, and 79 parts of p-chloronitrobenzene is added to the dehydrated mixture, which is then heated to 172°–175° C. and held at this temperature for 4 hours. The crude 2,4'-dinitro-4-methyldiphenyl ether formed is isolated by dilution with water as described in the previous examples. It is obtained in 91% yield, based on p-chloronitrobenzene. After recrystallization from ethanol the product melts at 101.5°–102° C., and its purity, as shown by Dumas nitrogen analysis, is practically 100%.

EXAMPLE 4

When the procedure of Example 3 is applied to the corresponding stoichiometric quantity of meta-nitrophenol (in N,N-dimethylacetamide), the reaction takes about 8 hours (at reflux) for completion, and the product is obtained in essentially the same high state of purity and high yield as in Example 3. The 3,4'-dinitrodiphenyl ether thus obtained melts at 119–120° C., and its purity by the $TiCl_3$ titration method is 98%. After recrystallization from ethanol, its melting point is 122.5°–123° C.

EXAMPLE 5

The procedure of Example 3 is repeated, except using ortho-nitrophenol in place of meta-nitrophenol and ortho-chloronitrobenzene in place of para-chloronitrobenzene. The condensation is completed by refluxing the dehydrated reaction mixture for 12 hours at 172° C. The purified 2,2'-dinitrodiphenyl ether obtained by drowning the reaction solution in water, and recrystallizing the dry, crude product from methanol, melts at 115°–116° C. Dumas nitrogen analysis shows its purity to be practically 100%.

EXAMPLE 6

The procedure described in Example 3 is repeated, except using a solution of 16 parts of potassium hydroxide (85% KOH content) in 30 parts of water as the acid binder, and 39.5 parts of ortho-chloronitrobenzene in place of the same quantity of the para-isomer employed in Example 3. The condensation is essentially complete after refluxing for 2 hours at 172° C., producing the 2,3'-dinitrodiphenyl ether, which may be isolated by drowning the reaction mixture in water and filtering off the precipitated product. It melts at 80.5° C.

EXAMPLE 7

The dehydration and condensation procedure described in Example 1 is repeated, except using the same quantity of N,N-diethylacetamide in place of the dimethyl analogue employed in Example 1. The condensation in this solvent becomes completed after 2 hours of refluxing at the somewhat higher reflux temperature of 179°–180° C. The 4,4'-dinitrodiphenyl ether is isolated by drowning the reaction solution in water and filtering off the precipitated product. The latter melts at 143.9–144.4° C.

EXAMPLE 8

A mixture consisting of 260 parts of N,N-dimethylpropionamide, 79 parts of p-chloronitrobenzene, and 110 parts of an aqueous filter cake containing 82.4 parts of the sodium salt of technical p-nitrophenol is dehydrated as described in Example 1, and the mixture is then refluxed for 2 hours at 185° C. The yield of isolated, crude 4,4'-dinitrodiphenyl ether is 89% of theory, based on p-chloronitrobenzene, and the product melts at 141°–142° C.

EXAMPLE 9

A mixture consisting of 260 parts of N-methylpyrrolidone (B.P. 202° C.), 82 parts of p-chloronitrobenzene, and 105 parts of an aqueous filter cake containing 81 parts of the sodium salt of technical p-nitrophenol was heated to a pot temperature of 144° to 190° C., under a fractionating column, until 13.5 parts of water were distilled off. The reaction mixture was then heated for 2 hours at 188°–190° C. A test sample showed that about 6.5 parts of unreacted p-chloronitrobenzene remained in the still. After removing this unreacted material by steam-distillation at a vapor temperature of 101°–104° C., the mass was drowned in water as described in Example 1, producing 113 parts of 4,4'-dinitrodiphenyl ether in the form of dry product, which by Dumas nitrogen analysis showed the correct nitrogen content, and which melted at 141°–142° C.

Cooling of a filtered test portion of the hot solution of the dinitro compound in the N-methylpyrrolidone gave the product in the form of pure crystals.

EXAMPLE 10

A mixture consisting of 0.79 part of p-chloronitrobenzene, 0.82 part of the dry sodium salt of p-nitrophenol, and 6 parts of N-methyl-ε-caprolactam (B.P. 235° C.) was heated within 2 to 3 minutes to 238° C., and the solution thus obtained was held at this temperature for 2 minutes, followed by drowning in 5 parts of water. The precipitated 4,4'-dinitrodiphenyl ether was filtered off from the water-soluble products by filtration and washed free of salts. 1.1 parts of dry dinitro compound were obtained, which melted at 141.5°–142.5° C.

EXAMPLE 11

A mixture consisting of 0.79 part of p-chloronitrobenzene, 0.696 part of dry p-nitrophenol, 0.4 part of potassium carbonate, and 6 parts of N-methyl-ε-caprolactam was heated within 3 to 4 minutes to 238°–240° C. Originally (at room temperature) this mixture was a yellow colored solution in which the colorless potassium carbonate was held in suspension. During the heating period carbon dioxide and water were evolved, and the color of the solution changed from yellow to brownish-red. With the disappearance of the potassium carbonate, a homogeneous solution of the reactants was formed. After heating for 2 to 3 minutes at reflux (238°–240° C.), the reaction mixture was drowned in water, and the precipitated 4,4'-dinitrodiphenyl ether was obtained as a bright yellow colored product. The yield was 1.17 parts of the dry dinitro compound, which melted at 141.5°–142.5° C.

Part B.—Catalytic reduction

EXAMPLE 12

140 parts of N,N-dimethylacetamide, 65 parts of 4,4'-dinitrodiphenyl ether, and a hydrogenation catalyst consisting of 0.05 part of platinum metal supported on 5 parts of charcoal are placed in a baffled glass-enamel reactor, equipped for rapid agitation (500 to 600 r.p.m.). After displacing the air over the reaction mass by nitrogen, the temperature is raised to 70°–80° C., and hydrogen is passed through at a rate substantially equal to its rate of absorption, whereby to maintain essentially atmospheric pressure within the vessel throughout the process. The reaction being exothermic, external cooling is applied, to maintain the temperature within the reaction mass in the range of 83°–87° C. Under these conditions the reduction is complete in about 2 hours. The reduction mass is then filtered at 75°–80° C. to remove the spent catalyst, and the clear filtrate is drowned in water. The precipitated, practically colorless 4,4'-diaminodiphenyl ether is filtered off and dried, giving the dry product in a yield of about 90% of the theoretical. The product melts at 191°–192° C., and its purity, as judged by nitrite absorption is 99.0%. Kjeldahl nitrogen analysis gives the theoretical value, and titration with $TiCl_3$ confirms the complete absence of any nitro group.

EXAMPLE 13

A mixture consisting of a filter cake containing 81 parts of the sodium salt of technical p-nitrophenol and 24.5 parts of water, 82 parts of p-chloronitrobenzene, and 130 parts of N,N-dimethyl-acetamide is dehydrated and then refluxed until the condensation is completed, as is described in Example 1 or 2. 290 parts of the resulting hot solution of 4,4'-dinitrodiphenyl ether in N,N'-dimethyl-acetamide containing sodium chloride in suspension is transferred directly to an apparatus as described in Example 12. The reduction by catalytic hydrogenation is then carried out at atmospheric pressure at 79°–81° C., using 0.05 part of catalytic platinum metal. After approximately 2 hours of hydrogenation, the reduction is complete, and the solution is filtered to remove the spent catalyst. The filtrate is drowned in 1000 parts of water, precipitating the 4,4'-diaminodiphenyl ether, which is then filtered off. The cake is washed with water until free of salt and dried at 80°–90° C.

In an actual procedure carried out as above, 90 parts of 4,4'-diaminodiphenyl ether were obtained, which corresponds to a yield of 89.4% of theory from the original sodium p-nitrophenolate. The crude product melted at 189°–191° C., and it showed by nitrite analysis a purity of 98.0%.

EXAMPLE 14

A condensation mass prepared as in Example 2 from 405 parts of sodium p-nitrophenate, 410 parts of p-chloronitrobenzene and 1400 parts of N,N-dimethyl-acetamide, was transferred, without isolating the p,p'-dinitrophenyl ether or removing the by-product sodium chloride, to a jacketed, steel autoclave, which was equipped for agitation at 200 r.p.m. or more. A catalyst consisting of 0.028 part of platinum metal supported on 2.8 parts of charcoal was added. After displacing the air in the autoclave with hydrogen, the temperature was raised to 50°–60° C., and the hydrogen pressure was increased to 500 p.s.i.g. and held at 400–500 p.s.i.g. until no further hydrogen was consumed.

The entire autoclave charge was then transferred to an agitated vessel of non-corrosive material, where 7 parts of hydrazine was added, followed by drowning the mixture in 5000 parts of water containing 14 parts of sodium bisulfite. The precipitated 4,4'-diaminodiphenyl ether was then subjected to a purification treatment as in Example 18 below. A product melting at 187°–188° C., in 94% of theory, based on the initial quantity of sodium p-nitrophenate, was obtained.

EXAMPLE 15

The procedure of Example 14 was repeated except using, for 582 parts of 4,4'-dinitrodiphenyl ether in the condensation mass, a catalyst consisting of 0.027 part of reduced palladium and 0.003 part of reduced platinum on 3.66 parts of an acetylene black. The reaction mass was maintained at 60° to 100° C. under a hydrogen pressure of 500 p.s.i.g., for 1 to 1.5 hours. After recovery and purification as in Example 18 below, a 4,4'-diaminodiphenyl ether product melting at 187°–189° C. was obtained in a yield of 95.5% based on the initial quantity of dinitro ether.

EXAMPLE 16

The procedure of Example 15 may be repeated using as catalyst 0.15 part of reduced palladium supported on a wood charcoal in essentially a 3:100 palladium-carbon ratio by weight. Essentially the same results are obtained.

EXAMPLE 17

The procedure of Example 15 may be repeated except using 10 parts of a commercial hydrogenation catalyst which contains by weight 46 to 52% of reduced and stabilized nickel supported on kieselguhr (diatomaceous earth). In this instance, the temperature is preferably maintained at 100° to 110° C., and the hydrogen pressure at about 700 p.s.i.g. A product of high purity is obtained.

*Part C.—Purification of the 4,4'diaminodiphenyl ether*

EXAMPLE 18.—(ACIDIFICATION AND REPRECIPITATION PROCEDURE)

An aqueous filter cake containing 96 parts of crude 4,4'-diaminodiphenyl ether and 104 parts of water, as obtained by drowning the reduction solution in water in any of the hydrogenation procedures described above and filtering off the precipitated diamine, is suspended in 900 parts of water in which 3 to 5 parts of sulfur dioxide has been dissolved at room temperature. The diamine is then dissolved by adding 90 parts of concentrated (35.5%) hydrochloric acid, and this is followed by adding 6 parts of a clarifying charcoal and filtering. After adding 2 to 3 parts of a commercial sequestering agent (for instance, ethylene-diamine tetracetic acid), the filtrate is rendered alkaline by the addition of 95 parts of ammonium hydroxide, and the precipitated diamine base is filtered off. The cake is washed with water until free of chloride ions, and then dried, giving a colorless product which melted at 190°–190.5° C. Kjeldahl nitrogen analysis and nitrite absorption show the product to be 99.8–100% pure.

In cases where the catalyst is not filtered off prior to drowning (as for instance in Example 14 above), the drowned reaction mass is preferably acidified as above to redissolve the precipitated diamine. The mass is then filtered to remove the suspended catalyst, and the filtrate is rendered alkaline with ammonium hydroxide to reprecipitate the diamine, following which the aqueous suspension may be treated with a sequestering agent and filtered as above. If desired, a small quantity of sodium hydrosulfite ($Na_2S_2O_4$) may be introduced with the sequestering agent, to minimize air oxidation of the diamine during filtration, washing and drying.

EXAMPLE 19.—(RECRYSTALLIZATION FROM AN ALCOHOL)

A vessel equipped with agitator and cover is charged with 150 parts of n-butanol, 0.22 part of hydrazine hydrate, 15 parts of crude 4,4'-diaminodiphenyl ether, and 1.5 parts of a clarifying wood charcoal. The air in the vessel is displaced by nitrogen, and the mixture is heated to 118°–120° C. under nitrogen pressure. The hot solution is then clarified by filtration, and the clear filtrate is collected in a crystallizer in which the air has been displaced by nitrogen. On cooling to room temperature, colorless, shiny crystals of the pure diamine are obtained, provided that contact of the hot solution with air-oxygen has been avoided. The purified product, which is isolated by filtering the cooled solution, and drying the cake to constant weight, melts at 191°–192° C. and shows 100% purity by nitrite absorption and Kjeldahl nitrogen analysis.

The alcoholic filtrate may be used repeatedly for purifying additional amounts of the diamine, without any substantial detrimental effects upon the color or purity of the recrystallized diamine.

Similar results are obtained by using in this procedure in place of the butyl alcohol, mixtures of selected solvents such as ethanol or methanol with N,N-dimethylacetamide, or of isopropanol with dimethylformamide.

Instead of using the dried diamine, the aqueous filter cake as obtained by drowning the reduction solution in water and filtering off the precipitated product may be used directly in this purification treatment. In this case, most of the water is first removed by subjecting the suspension of the wet filter cake in the butyl alcohol containing the hydrazine hydrate to an azeotropic distillation, and this is followed by clarifying the hot solution and crystallizing the pure 4,4'-diaminodiphenyl ether from the filtrate by cooling.

I claim as my invention:

1. A process of producing a diamino-diphenyl ether, which comprises reacting a halogeno-mononitrobenzene of the formula

with an alkali-metal nitrophenate of the formula

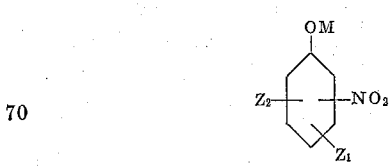

to produce the corresponding diphenyl ether, the reaction being effected by heating said reactants in an organic liquid of the group consisting of water-miscible aliphatic amides of the formula

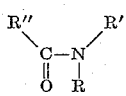

and water-miscible, saturated, heterocyclic compounds of the formula

wherein R, R' and R'' are alkyl radicals of 1 to 4 C-atoms, while R''' is a saturated alkylene radical of which not less than 2 and not more than 5 C-atoms in a straight chain constitute part of the heterocyclic ring, the quantity of said liquid being sufficient to form a fluid melt with the reactants at reaction temperature, adding to said mass a hydrogenation catalyst and reacting the resulting mass with hydrogen under a pressure ranging from 1 to 50 atmospheres whereby to produce the corresponding diamino-diphenyl ether, the symbols M, X, Y, $Z_1$ and $Z_2$ in the aforegoing formulas having the following meaning: M is an alkali metal, X stands for a halogen of the group consisting of Cl and Br and being located in a non-meta position with respect to the $NO_2$ group, while Y, $Z_1$ and $Z_2$ are members of the group consisting of hydrogen, alkyl, O-alkyl, and halogen, said alkyls being radicals of 1 to 4 C-atoms, and said halogen being a member of the group consisting of Cl and Br and being located in a position meta with respect to the $NO_2$ group in the same benzene ring.

2. The process of claim 1 followed by purifying the resultant diaminodiphenyl ether by recrystallizing said ether, under an inert atmosphere, from a substantially anhydrous aliphatic alcohol of 1 to 6 C-atoms containing hydrazine.

3. A process for producing p,p'-diaminodiphenyl ether in essentially pure form, which comprises adding essentially equimolecular proportions of p-chloronitrobenzene and sodium p-nitrophenate, the latter being in the form of an aqueous press cake, to a mass of N,N-dimethylacetamide equal in weight to from 1.5 to 2.5 times that of said p-chloronitrobenzene, heating the mass to distill off its water content, and maintaining the mass at 165° to 180° C. until reaction is complete, transferring the mass to a hydrogenation vessel and subjecting the same to hydrogenation under a pressure of 1 to 50 atmospheres in the presence of a hydrogenation catalyst, then separating the reaction product from the catalyst and solvent, and subjecting the same to recrystallization from n-butyl alcohol in the presence of hydrazine.

4. A process for producing p,p'-diaminodiphenyl ether in essentially pure form, which comprises adding essentially equimolecular proportions of p-chloronitrobenzene and sodium p-nitrophenate, the latter being in the form of an aqueous press cake, to a mass of N-methyl-ε-caprolactam equal in weight to from 1.5 to 2.5 times that of said p-chloronitrobenzene, heating the mass to distill off its water content and maintaining the mass at about 250° C. until reaction is complete, transferring the mass to a hydrogenation vessel and subjecting the same to hydrogenation under a pressure of 1 to 50 atmospheres in the presence of a hydrogenation catalyst, then separating the reaction product from the catalyst and solvent, and subjecting the same to recrystallization from n-butyl alcohol in the presence of hydrazine.

5. A process of producing a dinitrodiphenyl ether, which comprises reacting a halogeno-mononitrobenzene of the formula

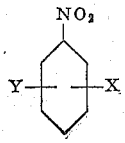

with an alkali-metal nitrophenate of the formula

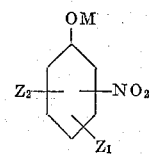

wherein M is an alkali metal, X stands for a halogen of the group consisting of Cl and Br located in a position other than meta to the $NO_2$ group, Y, $Z_1$ and $Z_2$ are members of the group consisting of hydrogen, alkyl, O-alkyl and meta-oriented halogen, said alkyls being radicals of 1 to 4 C-atoms and said orientation being taken with respect to the $NO_2$ group and said halogen being a member of the group consisting of Cl and Br, the reaction being effected by heating said reactants at reflux temperature in an organic liquid of the group consisting of water-miscible aliphatic amides of the formula

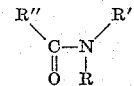

and water-miscible, saturated, heterocyclic compounds of the formula

wherein R, R' and R'' are alkyl radicals of 1 to 4 C-atoms, while R''' is a saturated alkylene radical of which not less than 2 and not more than 5 C-atoms in a straight chain constitute part of the heterocyclic ring, the quantity of said liquid being sufficient to form a fluid melt with the reactants at reaction temperature.

6. A process as in claim 5, the organic liquid selected being dimethylacetamide and the reaction being completed at 172°–178° C.

7. A process as in claim 5, the organic liquid selected being N-methyl-ε-caprolactam and the reaction being completed at about 235°–250° C.

8. A process as in claim 5, the organic liquid selected being N-methyl-2-pyrrolidone and the reaction mass being completed at about 188°–205° C.

9. A process as in claim 5, the alkali-metal nitrophenate being produced in situ from the corresponding nitrophenol and an alkali selected from the group consisting of sodium hydroxide, sodium carbonate, and the corresponding potassium compounds.

References Cited by the Examiner
UNITED STATES PATENTS

| | | | |
|---|---|---|---|
| 1,703,915 | 3/29 | Zitscher | 260—571 |
| 1,848,137 | 3/32 | Miller | 260—582 |
| 2,447,020 | 8/48 | Krueger et al. | 260—582 X |
| 2,777,879 | 1/57 | Spiegler | 260—571 |
| 2,894,036 | 7/59 | Graham | 260—580 |
| 3,061,585 | 10/62 | Wilder | 260—571 XR |

OTHER REFERENCES

Beilstein, "Organische Chemie," vol. 6, page 232 (1923).

Beilstein et al., "Organische Chemie," vol. XIII, page 441 (1930).

CHARLES B. PARKER, Primary Examiner.

JOSEPH P. BRUST, Examiner.